T. W. ALM.
PROCESS FOR CUTTING SURFACES ON CARBORUNDUM OR EMERY WHEELS.
APPLICATION FILED SEPT. 8, 1914.
1,135,978. Patented Apr. 20, 1915.
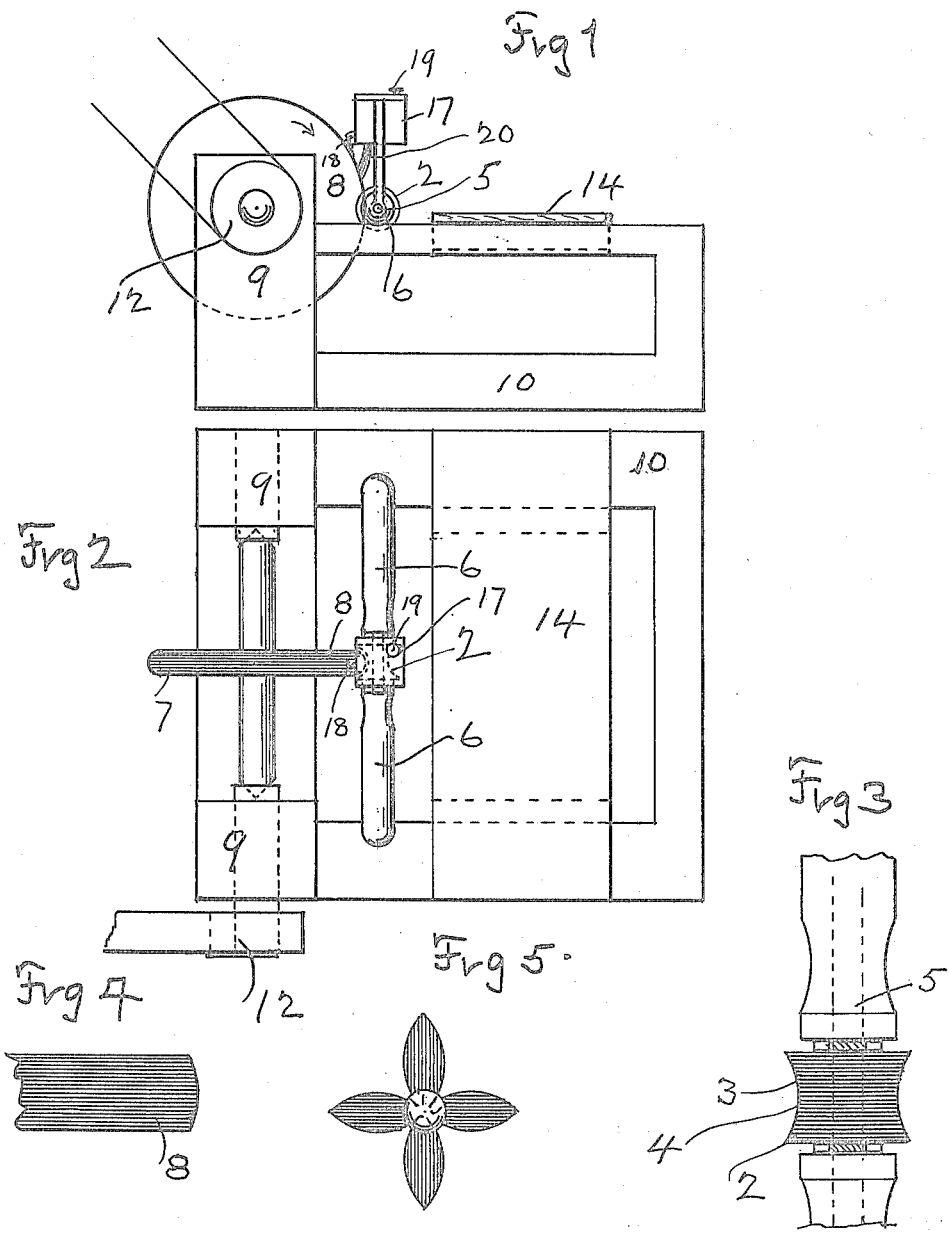

UNITED STATES PATENT OFFICE.

THURE W. ALM, OF BROOKLYN, NEW YORK.

PROCESS FOR CUTTING SURFACES ON CARBORUNDUM OR EMERY WHEELS.

1,135,978.　　　　　　Specification of Letters Patent.　　Patented Apr. 20, 1915.

Application filed September 8, 1914. Serial No. 860,598.

*To all whom it may concern:*

Be it known that I, THURE W. ALM, citizen of the United States, and resident of Brooklyn, in the county of Kings and State of New York, have invented certain new and useful Processes for Cutting Surfaces on Carborundum or Emery Wheels, of which the following is a specification.

This invention relates to a new method of producing cutting edges on the faces of emery or carborundum wheels used in cutting parallel lines on glassware.

It also relates to a novel forming tool designed for use in carrying out the method.

Heretofore parallel lines, such as shade lines or tint lines, were cut in glass by means of a cutting wheel having a single sharp cutting face. By the use of such cutting wheel each line was cut separately so that the cutting was slow and it required a very skillful workman to cut the lines parallel and of uniform depth.

Another method was to use a cutting wheel having a plurality of cutting edges or ridges on its face. These ridges were formed singly by a diamond cutting tool having a single cutting edge. With this method of cutting or dressing the emery wheels it was practically impossible to maintain the ridges parallel and of an even height and of an equal degree of sharpness. The result was that in using a wheel cut in this manner it was almost impossible to obtain a uniform cutting in the glass.

It is the main object of this invention to provide a method and a tool for cutting or dressing emery wheels by which the plurality of cutting edges on the wheel will be smooth, continuous, absolutely parallel and of an absolutely uniform height and degree of sharpness.

Another object of the invention is to provide a tool by means of which the process may be carried out and the face of the emery wheel dressed or cut as described.

In the drawing, Figure 1 is a side elevation showing the manner of carrying out my process and the manner of applying the cutting tool to the face of an emery wheel; Fig. 2 a plan view of the device shown in Fig. 1; Fig. 3 a detail elevation of the cutting tool and portions of the handles for supporting it; Fig. 4 a detail view of a portion of a dressed or cut emery wheel; and Fig. 5 a detail view showing the character of the cutting of glassware designed to be made with emery wheels dressed in accordance with my process.

In carrying out my process I employ a metallic forming wheel 2. As shown in the drawing this wheel is concave on its forming surface, as shown at 3. Its forming surface is made up of a plurality of parallel, smooth, continuous, circumferential forming edges or ribs 4. These ribs are sharp and the grooves between them are of uniform depth. As many of these ribs may be formed on each forming tool as may be desired or necessary for the character of dressing to be imparted to the emery wheel. This forming wheel is mounted loosely on a rigid shaft or spindle 5, said spindle extending into and being connected to the handles 6. Mounted on the spindle 5 on each side of the cutting wheel and substantially filling the space between the said wheel and the inner ends of the handles, are upright bars which support a container 17. In this container is placed a suitable mixture of very finely powdered emery and water; and this mixture is allowed to drop from a spout 18. Between the spout and the forming wheel 2 is arranged a distributing brush 20 which is adapted to evenly distribute the emery and water mixture over the emery wheel to be cut.

In the drawings 10 designates a suitable frame or support carrying the standards 9 in which is centered a shaft carrying the emery wheel 8, the surface 7 of which is convex. The shaft carrying the emery wheel is rotated by means of a pulley 12 over which passes a belt or other suitable driving means.

14 designates a slidable rest or table on which the operator may place or rest his arms during the process of cutting the emery wheel.

In carrying out the process the operation is as follows: The emery wheel is rotated rapidly in the direction indicated by the arrow in Fig. 1. The operator grasping the handle 6, forces the forming wheel 2 against the face of the emery wheel. The emery and water mixture is permitted to flow through spout 18 onto the face of the emery wheel and is evenly distributed thereon by means of the brush 20. The multiplicity of forming ridges on the wheel 2 forces the cutting mixture of water and emery against the face of the wheel and quickly causes the ridges to form parallel grooves in the emery wheel, these grooves corresponding in number and depth to the ridges of the forming wheel. The fine powder-like emery is forced into intimate contact with the face of the emery wheel and its minute particles grind off correspondingly minute particles of the emery wheel face, leaving the cutting ridges thereon smooth, continuous, sharp and well-defined and with comparatively smooth sides so that the edges thereof are sharp. By cutting a multiplicity of the ridges, ridges as they are cut hold the cutting tool true and there is no tendency to swerve or move laterally across the face of the emery wheel. In this way the multiplicity of ridges which are simultaneously cut prevent the tool moving laterally and breaking down or marring any one of the ridges.

By means of my process an emery wheel may be dressed or cut very quickly and with absolute accuracy and without the slightest danger of breaking or marring any one of the cutting ridges. The emery used in the emery and water mixture is extremely fine and consequently the emery is ground from the face of the wheel with corresponding fineness. This is necessary in order to grind minute ridges in the face of the emery wheel and maintain the cutting edges of said ridges smooth, continuous, sharp and uniform. It is manifest that if a coarse cutting mixture were used between the forming tool and the emery wheel it would be impossible to cut the fine grooves in the emery wheel, and the edges of the cutting ridges would not be smooth and sharp. It is also necessary to use a fine powdered emery in the cutting mixture in order that the grooves between the ridges will be as sharp as the cutting edges on the cutting tool. It is manifest that if the cutting mixture is coarse the grooves between the cutting ridges of the emery wheel will be correspondingly coarse.

It will be readily understood that by the use of an emery wheel dressed as described herein parallel lines, such as shown in Fig. 5, may be readily cut in the desired places in the ornamentation on the glassware. It is also manifest that these lines will be not only parallel but will be of a uniform depth and sharpness.

What I claim is:

1. The herein described process of forming parallel, continuous, smooth grooves and ridges on the face of an emery wheel consisting in rotating the emery wheel to be grooved, forcing a hard forming wheel against the face of said emery wheel, said wheel being provided with a plurality of parallel, circumferential, continuous, smooth, sharp ridges, and delivering a cutting mixture of a finely powdered abradant and a liquid between the forming wheel and the face of the emery wheel to be grooved, whereby the continuous smooth ridges on the forming wheel will force the abradant against the emery wheel and cause it to cut the grooves therein.

2. The herein described process of cutting parallel grooves and ridges on the face of an emery wheel consisting in rapidly rotating the emery wheel to be dressed, forcing a metallic forming wheel against the face of said emery wheel, said forming wheel being provided with a plurality of parallel circumferential smooth, continuous forming ridges, and delivering a cutting mixture of fine powdered emery and water between the forming wheel and the face of the emery wheel to be dressed.

3. The herein described process of cutting parallel grooves and ridges on the face of an emery wheel consisting in rapidly rotating the emery wheel to be dressed, forcing a metallic forming wheel against the face of said emery wheel, said forming wheel being provided with a plurality of parallel circumferential continuous forming ridges, and delivering a cutting mixture of fine powdered abrading material and a liquid between the forming wheel and the face of the emery wheel to be dressed.

Signed at Brooklyn, in the county of Kings and State of New York, this 5th day of September, A. D. 1914.

THURE W. ALM.

Witnesses:
GEORGE NOREN,
C. F. BARRETT.